United States Patent
Wassermann et al.

(10) Patent No.: US 12,000,480 B2
(45) Date of Patent: Jun. 4, 2024

(54) LOCKING UNIT WITH TWO-PART MIDDLE PIECE

(71) Applicant: SVM Schultz Verwaltungs-GmbH & Co. KG, Memmingen (DE)

(72) Inventors: Ralph Wassermann, Holzgünz (DE); Florian Hölzle, Illertissen (DE)

(73) Assignee: SVM Schultz Verwaltungs-GmbH & Co. KG, Memmingen (DE)

( * ) Notice: Subject to any disclaimer, the term of this patent is extended or adjusted under 35 U.S.C. 154(b) by 0 days.

(21) Appl. No.: 18/313,074

(22) Filed: May 5, 2023

(65) Prior Publication Data
US 2023/0358310 A1 Nov. 9, 2023

(30) Foreign Application Priority Data
May 5, 2022 (DE) .......................... 102022111232.2

(51) Int. Cl.
*F16H 63/34* (2006.01)
*B60T 1/00* (2006.01)

(52) U.S. Cl.
CPC .......... *F16H 63/3433* (2013.01); *B60T 1/005* (2013.01); *F16H 63/3475* (2013.01)

(58) Field of Classification Search
CPC .. B60T 1/005; F16H 63/3483; F16H 63/3433; F16H 63/3475; F16H 63/3425; F16H 61/0025
See application file for complete search history.

(56) References Cited

U.S. PATENT DOCUMENTS

2020/0191267 A1\* 6/2020 Mang ................... F16H 63/3483
2022/0128146 A1\* 4/2022 Schulz .................... F16H 63/38

FOREIGN PATENT DOCUMENTS

DE    102020115045 A1    12/2021

OTHER PUBLICATIONS

1 Foreign Communication for German Patent Application No. 102022111232.2, German Search Report, 5 pages.
German Patent and Trademark Office; 2nd Office Action concerning German Patent Application No. 10 2022 111 232.2; Jan. 11, 2024, 3 pages (English translation is also 3 pages).

\* cited by examiner

*Primary Examiner* — Lori Wu
(74) *Attorney, Agent, or Firm* — Scheef & Stone, LLP; Keith C. Rawlins

(57) ABSTRACT

Disclosed is a locking unit having a piston and serving for locking the movement of the piston which can be acted on with pressure of a fluid. The locking unit can additionally have an electromagnet and at least one detent element. The detent element interacts with an armature or an armature rod of the electromagnet, and the piston has at least one detent receptacle, where the piston can be secured by the retaining interaction of the detent element with the detent receptacle. The piston is adjustable between a retracted position and an extended position. The piston is mounted at least partially in a middle piece which is surrounded at least partially by a housing, and the middle piece is configured in two parts from a metal part and a plastic part.

14 Claims, 10 Drawing Sheets

LOCKING UNIT WITH TWO-PART MIDDLE PIECE

CROSS-REFERENCE TO RELATED APPLICATIONS

This non-provisional application claims the benefit of, and priority to, German Application No. 10 2022 111 232.2, entitled Locking Unit with Two-Part Middle Piece, filed on May 5, 2022, which is incorporated by reference in its entirety.

FIELD OF THE DISCLOSURE

The present disclosure generally relates to a locking unit, and more particularly to locking units for automatic transmissions.

BACKGROUND

Locking units are used, for example, for automatic transmissions of motor vehicles which are locked when parked. Locking units of this type are typically designed in such a manner that, depending on the shift position, the parking lock is or is locked or is not locked in different positions. For this purpose, use can be made, for example, of a piston which can be moved in particular hydraulically and can be locked electromechanically. Such a locking unit is known for example from international patent application WO 2013/131926 A1. This locking unit comprises a sintered middle piece. However, this middle piece could be improved in terms of production and scope of function.

SUMMARY

Disclosed is a locking unit for locking a movement of a piston which can be acted on with pressure of a fluid, the locking unit including: the piston; an electromagnet; at least one detent element; a middle piece; and a housing, wherein the at least one detent element interacts with an armature or an armature rod of the electromagnet, wherein the piston has at least one detent receptacle, wherein the piston can be secured by a retaining interaction of the at least one detent element with the at least one detent receptacle, wherein the piston is adjustable between a retracted position and an extended position, wherein the piston is mounted at least partially in the middle piece, wherein the middle piece is surrounded at least partially by the housing, wherein the middle piece is configured in two parts from a metal part and a plastic part.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
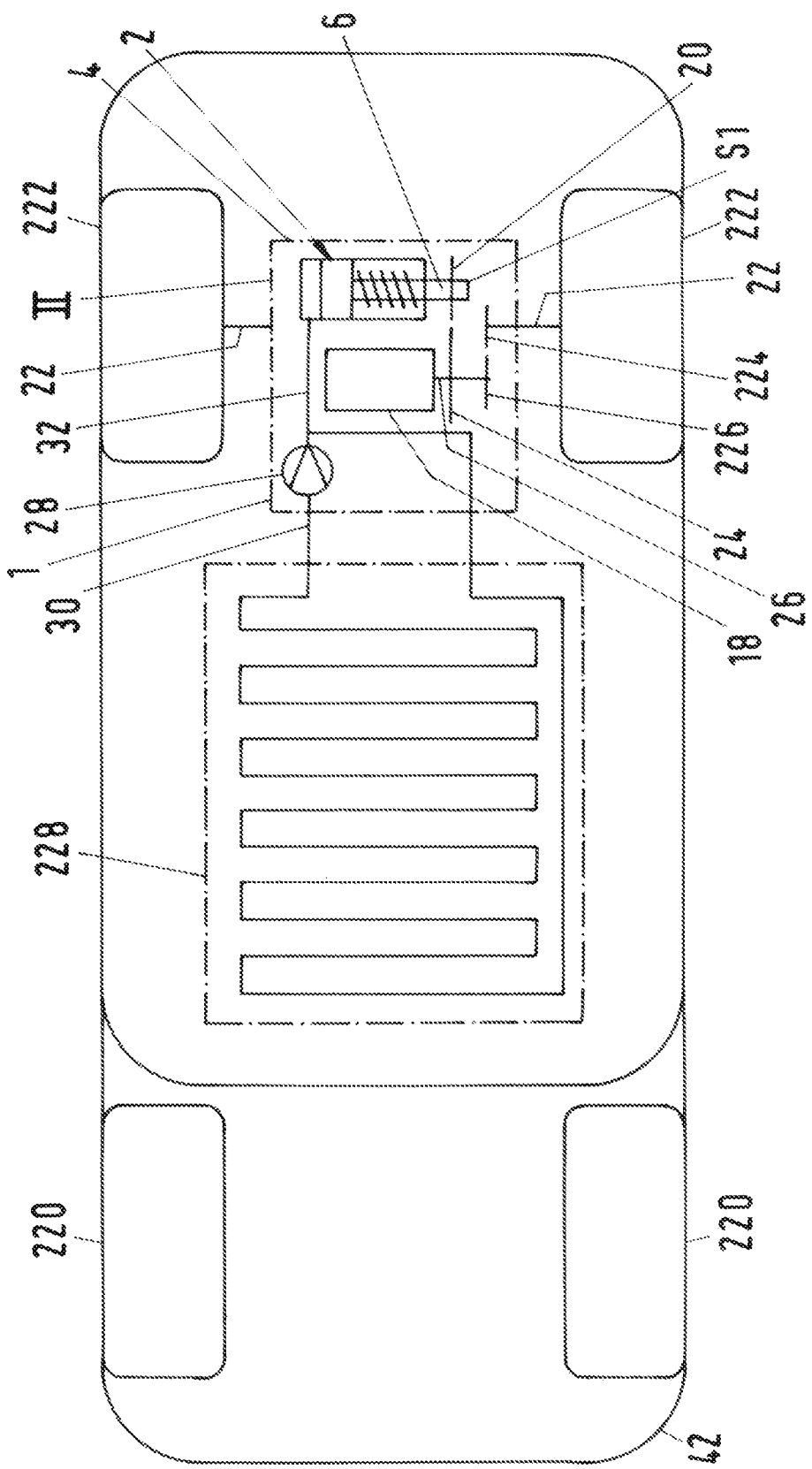
FIG. 1 shows a schematic view of a vehicle with a locking arrangement according to the disclosure.

A locking unit is disclosed, comprising a piston and serving for locking the movement of the piston which can be acted on with pressure of a fluid, wherein the locking unit has an electromagnet and at least one detent element, and the detent element interacts with the armature or the armature rod of the electromagnet, and the piston has at least one detent receptacle, and the piston can be secured by the retaining interaction of the detent element with the detent receptacle, wherein the piston is adjustable between a retracted position and an extended position, wherein the piston is mounted at least partially in a middle piece which is surrounded at least partially by a housing, wherein the middle piece is configured in two parts from a metal part and a plastic part.

The mounting of the piston on the middle piece has shown that this leads to advantageous operation. The two-part design of the middle piece and the corresponding materials have shown that it can then be configured considerably less expensively and with an extended scope of function.

The middle piece then has a metal part which can assume, for example, guide tasks of adjoining components and is therefore highly loaded. On account of the mounting tasks, the metal part therefore consists of a corresponding metallic bearing material. The metal part can consist of a magnetically soft material. It can then be part of the magnetic circuit of the electromagnet in an advantageous way and can conduct the magnetic field lines satisfactorily.

In addition, the middle piece has a plastic part which up to now has been configured as a sintered part, for example, in a complex and expensive manner. Fluidic conducting tasks or the support of seals can be intended for the plastic part, with the result that the respective material is loaded to a relatively small extent. The plastic part can consist of a thermoplastic; for example, a thermoplastic injection molded part. This is an inexpensive production method, by way of which, in addition, plastic parts which are shaped in almost any desired way can be produced in a single work operation.

Although the middle piece has two individual parts which can be produced separately from one another, it can be understood to be an assembly and can realize the advantages associated with this. The middle piece can namely be preassembled for mounting in the locking unit, in order to then be provided as an assembly to the mounting process of the locking unit.

Each of the two parts of the middle piece can then be produced separately from the respective other one by way of a separate production method which can be adapted in each case to costs, service life and field of functions. They then together form the middle piece. The middle piece can consist of these two parts; alternatively, the middle piece can consist of these two parts and a sealing ring. The plastic part can be of a sleeve-like configuration, in order to make it possible for other components to pass through the interior space.

In aspects, the plastic part and the metal part can be connected to one another in an integrally joined or non-positive and/or positively locking manner. In aspects, injection molding of the plastic part onto the metal part leads to an inseparable and durable connection. A following connecting step likewise become superfluous. However, injection molding can lead to structural limitations and/or high costs of an injection molding die. A non-positive connection, for example a pressed connection, is also conceivable, however; a positively locking connection is additionally conceivable, for example. Each part can then be produced separately in a less expensive manner. In addition, pressing as an inexpensive connecting step and rarely faulty.

In aspects, the plastic part can have supporting segments which run in the longitudinal direction on the circumferential side, extend in the radial direction, and can support a tubular piece and/or the metal part. The supporting segments can be configured to reduce costs and for functional integration of the plastic part. The supporting segments can be of web-like configuration and reduce necessary plastic material to a minimum. This prevents, for example, shrinkage is or sunken portions, as a result of which the ability to observe tolerances is considerably impaired. The supporting segments allow, however, a secure connection to the tubular piece/metal part. The region between the plastic part and the metal part and/or between the plastic part and the tubular piece can in each case be a connecting region. The supporting segments can be configured on the outer circumference of the plastic part, in order not to limit an inner circumference for further components, for example the piston or the armature/armature rod. The supporting segments can be arranged equidistantly in the circumferential direction, in order to prevent the necessity of aligned preassembly or assembly.

The connecting region can be configured as a crown ring. Segment intermediate spaces which run in the longitudinal direction in the circumferential side and are configured between adjacent supporting segments can be configured in the connecting region. As a result, for example, a passage of fluid can be enabled.

In aspects, the plastic part can have on the circumferential side, a supporting flange which protrudes in the radial direction; the supporting segments can extend in one or both directions along the longitudinal direction, starting from the supporting flange. The supporting flange can be configured by the plastic part in order to lower costs and for functional integration. The supporting flange can therefore define two different supporting segments, namely supporting segments which are assigned to the metal part and/or supporting segments which are assigned to the tubular piece. Each of the supporting segments can therefore be adapted to the part to be supported. The supporting flange can project beyond the supporting segments in the radial direction. As a result, the supporting flange can advantageously assume a self-centering function and, for example, can be supported against the housing of the locking unit. The supporting flange can be configured on the outer circumference of the plastic part, in order not to limit an inner circumference for further components, for example the piston or the armature/armature rod.

In aspects, the plastic part can have on the circumferential side, a carrier flange which protrudes in the longitudinal direction and supports a sealing ring. The carrier flange can be configured by the plastic part in order to lower costs and for functional integration. The sealing ring does not have to be part of a middle piece assembly, but it can certainly then be supported by it in the mounted state. The sealing ring can seal the middle piece or a channel against the housing of the locking unit. This construction is geometrically simple and therefore inexpensive; a simple "open/closed" injection molding die can be used as a result of the extent of the carrier flange in the longitudinal direction. The carrier flange can protrude from the supporting flange for cost and installation space reasons.

In aspects, the carrier flange can have the supporting segments constructed behind it or can be supported on them. As a result, the carrier flange is of highly stable configuration, and high sealing forces can be applied.

In aspects, the metal part can have a cap portion and/or a hollow-cylindrical portion which extends in the longitudinal direction and extends from the cap portion.

The cap portion can therefore cover the plastic part on the end side, and in some aspects the entire end side, and thus protect it. In addition, the metal part or its cap portion can then bear against the electromagnet or its coil former and, as a result, be moved into the immediate vicinity of the electromagnet and magnetic circuit, in order to achieve an improved magnetic flux. It is conceivable that the cap portion configures a yoke part. The yoke part can itself be part of the magnetic circuit, as a result of which the magnetic field lines can be influenced in a highly satisfactory way. The armature space of the electromagnet can even be delimited from the cap portion or the yoke part which can be of pot-like design. Here, an arrangement can be selected in such a way that a part of the armature can dip into the yoke part.

In addition, the cap portion can configure a stop face for the piston pressure piece of the piston. The cap portion can have a front portion, from which a pot wall portion protrudes radially on the inner circumferential side, for example at a right angle, and a circumferential wall portion protrudes radially on the outer circumferential side, for example, at a right angle. On the circumferential side, the pot wall portion can delimit a pot bottom portion which is connected to it. In addition, it is conceivable that the metal part, its cap portion or its front portion has a magnetic cone ring which protrudes in the longitudinal direction and serves for the favorable introduction of the magnetic field into the armature.

The hollow-cylindrical portion can extend from the cap portion, starting from its pot wall portion or pot bottom portion. The hollow-cylindrical portion can have a number of radial latching element bores for receiving the latching elements. As a result, the latching elements can be guided reliably. The hollow-cylindrical portion can therefore configure a ball cage.

The metal part can have a penetration bore, through which the armature or the armature rod protrudes and can be mounted. The penetration bore can be configured in the pot bottom portion.

In aspects, the metal part can configure, with the plastic part, a channel which lies in between, and/or the plastic part can configure, with a tubular piece, a pressure space and/or a channel which lies in between. The segment intermediate spaces are configured as a fluidic connection between a pressure conducting channel and a pressure space. This makes it possible to conduct pressure from the pressure conducting channel into the pressure space. It is therefore possible in a space-saving way that the two parts of the middle piece configure channels. The configuration of two separate channels with the plastic part is even conceivable. A first channel with the metal part can serve for inflow and outflow of fluid into/out of an equalization space. The equalization space can arise by way of a longitudinal adjustment of the piston. The first channel serves for pressure equalization, since fluid can flow into the extendable compensation space, and vice versa. A second channel with the tubular piece serves to conduct fluid into the pressure space and out of the latter.

A respective channel can therefore be configured between adjacent supporting segments in the circumferential direction, the plastic part on the one radial side and the metal part or the tubular piece on the opposite radial side. More channels are therefore also conceivable.

In aspects, a supporting flange can separate these two channels in a fluid-tight and pressure-tight manner. Fluids with different pressures can therefore be conducted in the two channels, without a pressure equalization taking place and without them being mixed. It is conceivable that the supporting flange is configured without openings in the longitudinal direction.

In aspects, the metal part can guide the armature of the electromagnet in each of its positions. This is possible via the pot-shaped yoke part. The armature can be guided by the pot wall portion in each of its positions. This embodiment is surprisingly simple in structural terms, and makes further guide elements for the armature superfluous. In addition, it serves to save installation space.

In aspects, a front portion of the cap portion can have a material thickness which is greater at least by the factor 2 than the material thickness of an adjoining portion or pot wall portion. As a result, magnetic field lines are deliberately guided in and through the front portion and are kept away from the pot wall portion, in order to produce an efficient magnetic circuit. In addition, it is conceivable, in order to increase this effect, that a transverse center plane of the yoke part or pot-like receiving space (formed by the pot wall portion and the pot bottom) extends through the front portion. The material thickness can be the material thickness in the direction of the surface perpendicular of a surface of the relevant component.

In aspects, at least one of the supporting segments can configure a longitudinal stop for the metal part and/or the tubular piece. As a result, a secure position can be ensured during mounting and in operation. It is conceivable that the respective longitudinal stop extends in the radial direction and projects beyond the respective supporting segment in the radial direction. As a result, a defined intermediate space can also be configured between the metal parts/tubular piece and, for example, the supporting flange, which intermediate space can be part of the first/second channel.

In aspects, a longitudinal spacing can be provided between the tubular piece on one side and the supporting flange and/or carrier flange on the other side. As a result, a defined intermediate space which can be part of the first/second channel can be configured in a way which saves installation space.

In aspects, the plastic part can form a bearing face for a piston pressure piece. Here, the bearing face interacts with the shell face or outer face of the piston pressure piece or its O-ring seal.

Finally, it can be seen that the middle part assumes a wide variety of tasks and can have various effects, such as conducting fluid, mounting the piston, raceway or bearing face for piston rings or O-ring seal, magnetic flux, solenoid armature mounting, configuring a ball cage for the latching elements, anti-rotation safeguard, sensor target, centering/orienting the assembly within the housing.

In the figures, identical or mutually corresponding elements are denoted in each case by the same reference signs and will therefore not be described anew unless expedient. In order to avoid repetitions, features that have already been described will not be described again, and such features are applicable to all elements with the same or mutually corresponding reference designations unless this is explicitly ruled out. The disclosures in the description as a whole are transferable analogously to identical parts with the same reference signs or the same component designations. It is also the case that the positional indications used in the description, such as for example above/top, below/bottom, lateral, etc., relate to the figure presently being described and illustrated and, in the case of the position being changed, are to be transferred analogously to the new position. Furthermore, it is also possible for individual features or combinations of features from the different exemplary embodiments shown and described to constitute independent or inventive solutions or solutions.

FIG. 1 depicts an electric vehicle 42 with a locking arrangement 1. The electric vehicle 42 merely shows the principle and also comprises two front wheels 220 and two rear wheels 222 which are driveable. For this purpose, at least one electric axle 4 is provided per rear wheel 222 or one electric axle for the two rear wheels 222. Front wheel drive or all-wheel drive is alternatively also conceivable. Each of the rear wheels 222 has an axle 22 with a gearwheel 224 arranged thereon for conjoint rotation. The gearwheel 224 is engaged by a gearwheel 226 which is arranged on a shaft 26 of an electric motor 18 for conjoint rotation. The driving force of the electric motor can thus be transmitted to the rear wheel 222 or the rear wheels 222.

A gear 24 or gear wheel is likewise connected to the shaft 26 for conjoint rotation. Said gear 24 is engaged by a blocking gear 20. A piston 6 of a locking unit 2 or a follow-up mechanism can optionally engage in the blocking gear 20 in order to release or to prevent rotation of the blocking gear 20. In the position shown, the piston is shown in its retracted position S1, and a follow-up mechanism engages in a form-fitting manner in the blocking gear 20. A mechanical chain of effect is thus produced starting from the piston 6, specifically: piston 6—blocking gear 20—gear 24—shaft 26—gearwheel 226—gearwheel 224—axle 22—rear wheel 222 or the rear wheels 222. This chain of effect can also be configured differently or with fewer machine elements.

The locking arrangement 1 for the electric vehicle 42 therefore comprises the locking unit 2, the electric motor 18 and at least one axle 22 which can be driven by the electric motor 42. The locking unit 2 has the piston 6. It also serves for locking the movement of the piston 6 which can be acted on with pressure of a fluid. In the retracted position S1 shown, the piston 6 acts on the axle(s) 22 in such a manner that the rotation thereof is mechanically blocked.

The electric vehicle 42 also comprises a drive battery 228 and a coolant circuit 30 with a corresponding line. For circulating the fluid contained in the coolant circuit 30, a pump 28 is provided which has two operating directions or directions of rotation, namely suction and pressure. In addition, a line 32 is provided between pump 28 and locking unit 2 in order to act on the piston 6 with hydraulic pressure. The line 32 is connected to the coolant circuit 30, with fluid being able to be fed from the coolant circuit into the line.

Figure 2:
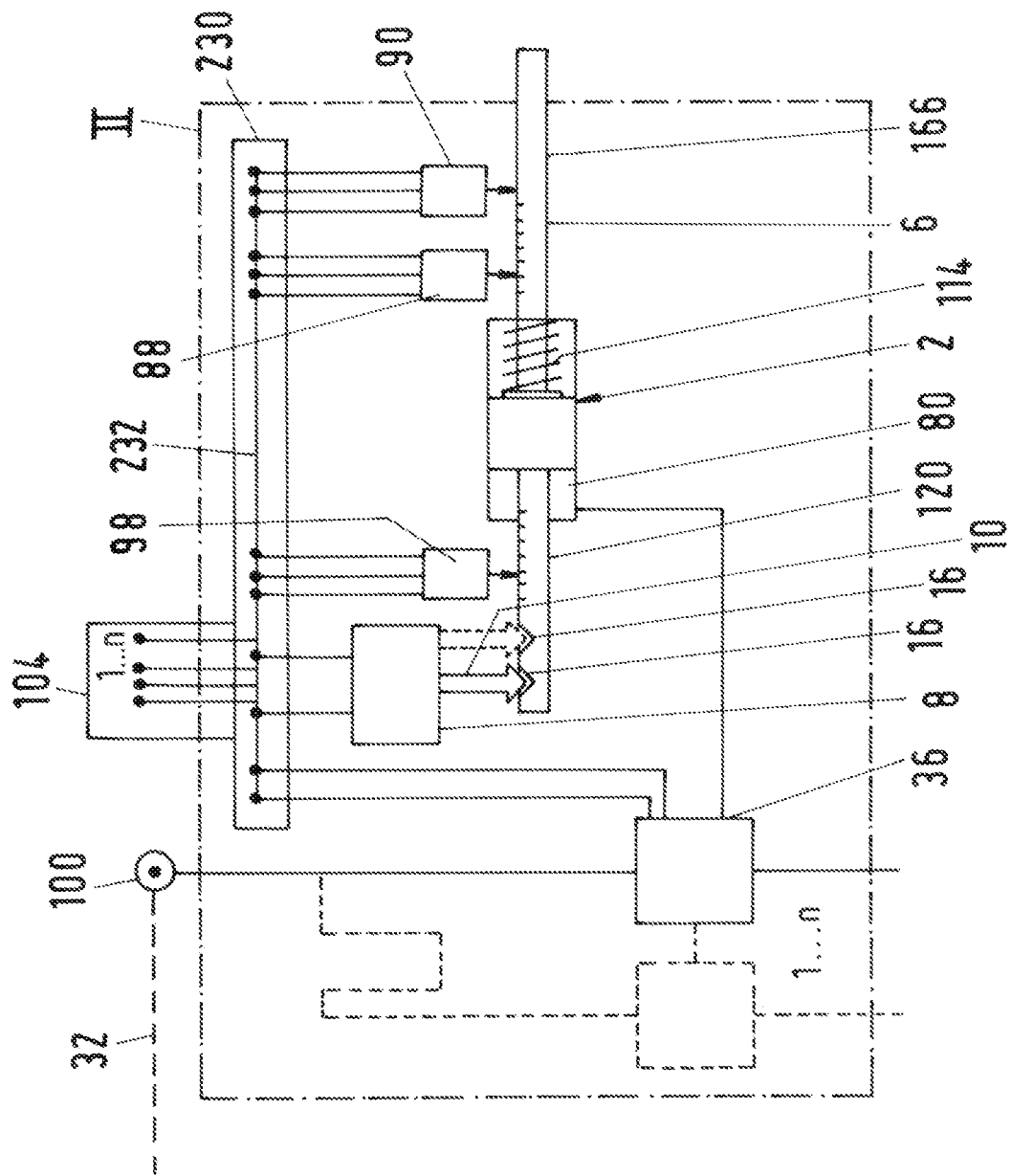
FIG. 2 shows a detail II according to FIG. 1.

FIG. 2 shows a detail II from FIG. 1, the detail II also being of a schematic character. From the detail II from FIG. 1, only the locking unit 2 is illustrated here. A fluid inlet 100 which can be an opening in a housing 40 of the locking unit 2 can be seen. The line 32 leads to the fluid inlet 100. The locking unit 2 from FIG. 2 also comprises a solenoid valve 36, with a nonreturn valve 43 or a plurality of valves also being conceivable. The valves regulate and control at least one fluid inlet and/or fluid outlet of the locking unit 2 for hydraulic pressurization of the piston 6. The fluid runs through the solenoid valve 36 and a pressure line network to a pressure chamber 80 in order to pressurize there the piston 6 to the right in the plane of the image and to bring it into its extended position S2. The piston 6 is pressurized by a restoring element, for example a piston spring 114, to the left in the plane of the image, in order to bring it into its retracted position S2. The respective piston position S1, S2 is electromechanically locked, with an electromagnet 8 and a detent unit 120 being used for this purpose. As will be described later in detail, the detent elements 10 can be latched in detent receptacles 16, 202, 204 or blocked there, as a result of which a longitudinal movement of the piston 6 is also blocked. The respective position of the detent unit 120 can be sensed by a magnetic field sensor 98. The respective position of the piston 6 or of its piston tube 166 can be sensed by at least one magnetic field sensor 88, with it also being possible for a further magnetic field sensor 90 to be provided for this purpose.

The locking unit 2 deftly comprises electrical interlinking 230 comprising a BUS system 232. The solenoid valve 36, the electromagnet 8 and the magnetic field sensors 88, 90 and 98 are connected to said BUS system in terms of signaling. In addition, a single plug or an electronic interface 104 is provided. All of the electronic components of the locking unit 2 can thus be supplied in terms of signaling via a single electronic interface 104.

Figure 3:
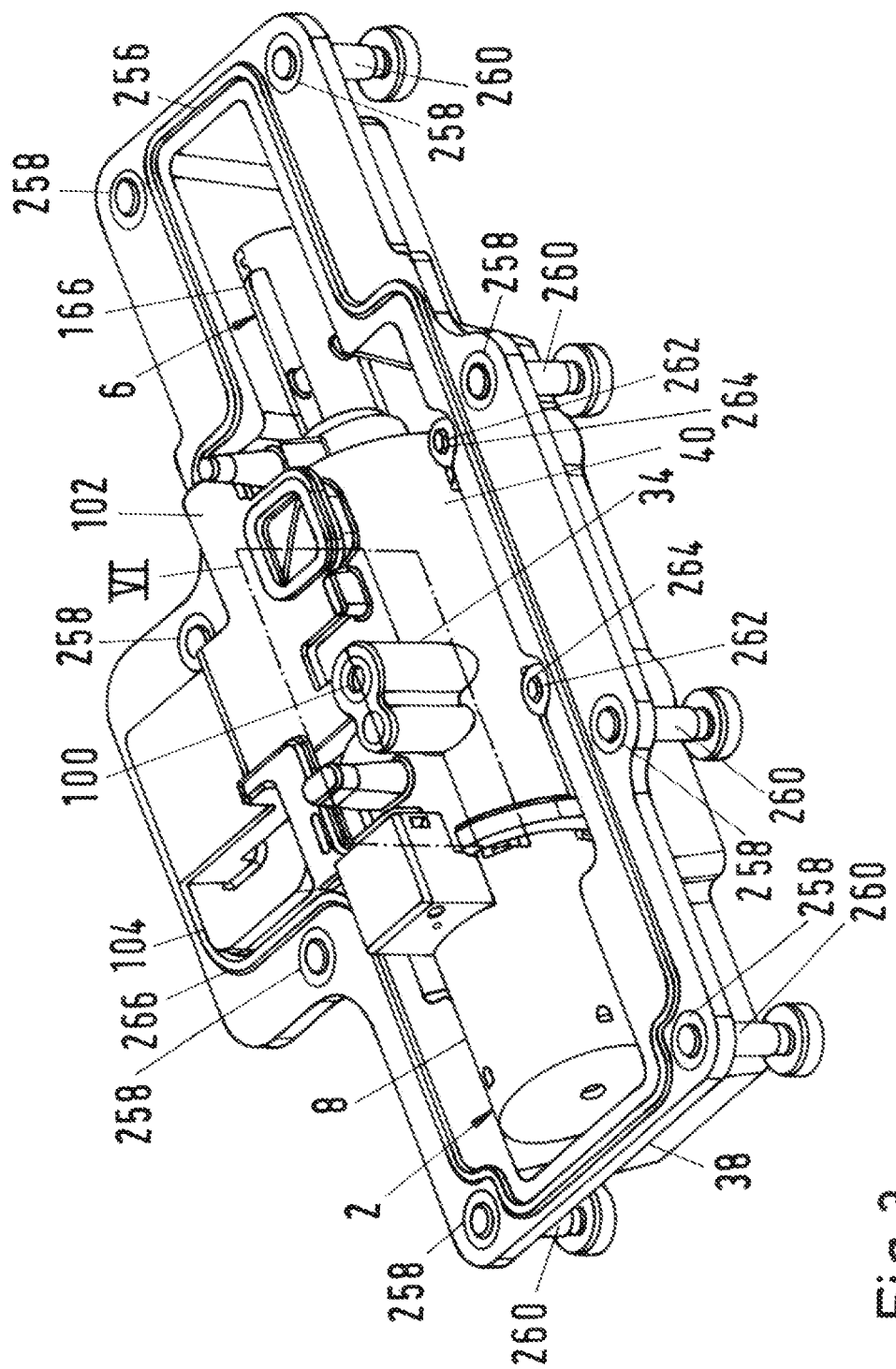
FIG. 3 shows a perspective view of a locking unit according to the disclosure.

FIG. 3 shows a perspective view of a locking unit 2. The latter has a longitudinal direction L, a radial direction R and a circumferential direction U. It can be seen that it is arranged in an outer housing 38, of which only one of two shells is illustrated. The shell which is shown has a seal 256. The outer housing 38 has bores 258. Screws 260 reach through them to fasten said outer housing. The housing 40 of the locking unit 2 also has bores 262 through which screws 264 reach for fastening said housing in the outer housing 38. The outer housing 38 comprises merely three openings, namely a fluid opening (not illustrated), an electrical opening 266 and a mechanical opening (not illustrated). The electronic interface 104 protrudes through the electrical opening 266.

FIG. 3 also shows an electrical module housing 102 which is a housing separate from the housing 40 and comprises a leadframe on which at least one magnetic field sensor 88, 90 is arranged and which comprises a BUS system 232. The leadframe is insert molded by the plastic of the electrical module housing 102. The electronic interface 104 is formed by the electrical module housing 102.

Figure 4:
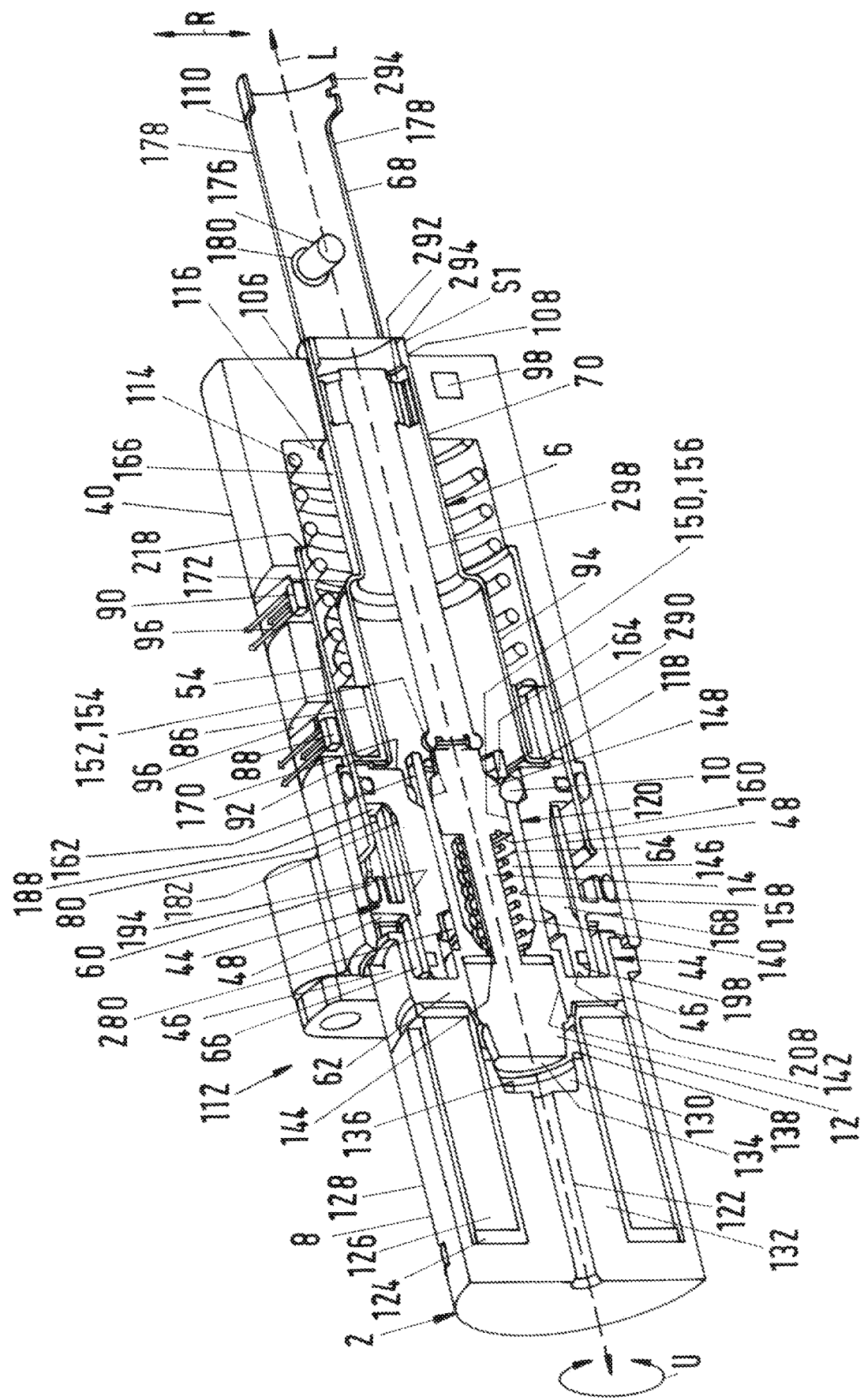
FIG. 4 shows a perspective sectional view through a locking unit in the retracted position.
Figure 5:
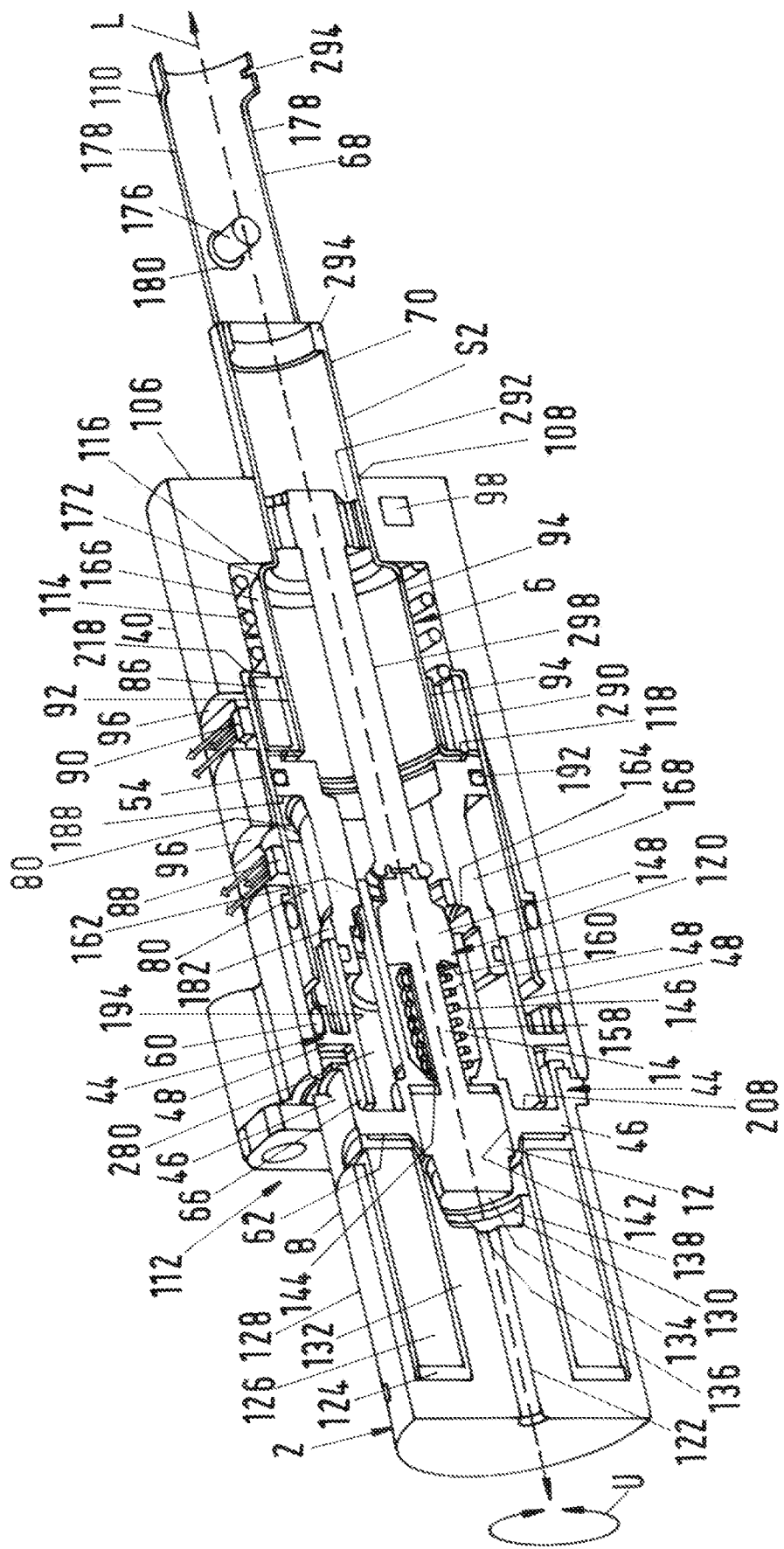
FIG. 5 shows a perspective sectional view through the locking unit of FIG. 4 in the extended position.

The locking unit 2 is described in more detail with regard to FIGS. 4 and 5.

FIG. 4 shows a perspective sectional view through a locking unit 2 in the retracted position S1.

The locking unit 2 has a housing 40, at the front housing end 106 of which there is provided an opening 108 out of which the front end 110 of the piston 6 projects. The piston 6 is designed as a hollow part. At the rear housing end 112 opposite the opening 108, an electromagnet 8 adjoins the housing 40 in the axial direction or longitudinal direction. Axial direction here means either the axis of symmetry or longitudinal axis L or else the direction of movement of the piston 6. In the housing 40, the piston 6 is mounted so as to be movable in the axial direction, for example along its longitudinal axis L. In aspects, the piston 6 is at least partially mounted in a middle piece 44 which is at least partially surrounded by the housing 40, the middle piece 44 being formed in two parts from a metal part 46 and a plastics part 48. Here, a driver is provided for the movement of the piston 6, and in aspects, the piston 6 can be acted on with pressure, for example with hydraulic pressure, the force component of said pressure being directed counter to the direction of force of a piston spring 114. Here, the piston spring 114 is supported at one end on a shoulder 116, which adjoins the housing end 106 at the inside, or on a front face inner wall of the housing 40. At the other end, the piston spring 114 is supported on a flange ring 118 of the piston 6 or, as shown in this embodiment, on a magnetic element 86 or on a plastics carrier 92. Said flange ring 118 is situated in the interior, centrally in the housing 40.

The piston 6 moves, owing to the pressure, between multiple positions; in the variant shown here, two positions (retracted position S1, extended position S2) are provided by way of example in FIGS. 4 and 5. The situation of the piston 6 in the respective positions is fixable by a detent unit 120 which is equipped with detent elements 10. The electromagnet 8, or the elements thereof, serve(s) for the actuation of the detent unit 120, for the detent elements 10 thereof. The electromagnet 8 has a coil body 124 which bears a winding 126. Said winding 126 has a wire which can be flowed through by electrical current. The winding 126 is closed off radially to the outside (in relation to the longitudinal axis L) by a magnet housing 128. A magnetic field arises as a result of an electrical energization of the winding 126.

An armature space 130 is provided in the interior of the coil body 124, the armature space 130 in the present case filling approximately ⅔ of the interior space of the coil body 124. Here, the armature space 130 is oriented in the direction of the piston 6. The remaining region of the interior space of the coil body 124 is filled by a magnet core 132 which, as is customary, is composed of magnetically soft material, which guides the magnetic field lines in an effective manner. Merely for reasons of simple illustration, the magnet housing 128 and magnetic core 132 are illustrated here in one piece. In the armature space 130, there is situated an armature 12 which, in the exemplary embodiment shown here, is of cylindrical form in sections and of frustoconical form in sections and has a base surface 134 on the frustoconical section. A gap 138 can be formed between the base surface 134 and a terminating surface 136, which faces toward the armature space 130 of the magnet core 132.

When the winding 126 is not electrically energized, a magnet spring 140 pushes the armature 12 to the right (in relation to the plane of the image), such that the gap 138 has its maximum extent. If the winding 126 is electrically energized, it generates a magnetic field which pulls the armature 12 to the left (in relation to the plane of the image) counter to the force of the magnet spring 140, such that the gap 138 is closed or is virtually closed. The armature 12 bears an armature rod 14. Merely for reasons of simple illustration, the armature 12 and armature rod 14 are illustrated here in one piece. Here, the armature rod 14 is oriented concentrically with respect to the armature 12; armature 12 and armature rod 14 are mounted so as to be movable in the longitudinal direction L. The construction can be selected here such that the armature 12 has an axial bore that receives the armature rod 14. Here, the armature rod 14 projects beyond the armature 12 to one side of the latter. A central axial bore 122 is provided in the magnet core 132. Fluid can flow into the gap 138 through the bore 122 in order to permit rapid movement of the armature 12. This fluid can also be pushed out through the bore 122. Since the bore 122 does not bear an armature rod, it can be formed with a considerably smaller diameter, as a result of which costs and construction space are saved.

The armature space 130 is delimited on one side by the magnet core 132, wherein, as already described, the magnet core 132 fills that part of the interior space of the coil body 124 which is averted from the piston 6, and said magnet core 36 thus also describes the axial end of the electromagnet 8, but also of the locking unit 2, together with the magnet housing 128. On the other side, facing toward the piston 6, the armature space 130 is delimited by a yoke part 142 which is formed from a magnetically soft material in order to guide the magnetic field lines in an effective manner. Here, a part of the armature 12 protrudes into the yoke part 142. The yoke part 142 here can be part of the detent unit 120 and/or of the electromagnet 8. The yoke part 142 or a middle piece 44 has a through bore 144 which receives and possibly also bears the armature rod 14.

Part of the detent unit 120 is a metal part 46 or the hollow cylinder section 64 thereof. The metal part 46 also has a cap section 62 which here forms the yoke part 142.

The two sections 62, 64 adjoin in each case one corresponding receiving space in the radial direction R. Here, the cap section 62 or the yoke part 142 delimits the armature space 130 and the hollow cylinder section 64 delimits an interior space 146. The interior space 146 extends here in the longitudinal direction L. The magnet spring 140 is also arranged in the interior space 146, said magnet spring being supported at one end on the cap section 62 or yoke part 142 and at the other end on a control element 148, which is arranged on the end side of the armature rod 14. Here, the control element 148 is arranged in a positionally fixed manner on the armature rod 14 and is arranged so as to be longitudinally displaceable together with it. Merely for reasons of simple illustration, the armature rod 14 and control element 148 are illustrated here in one piece. The control element 148 can have a central axial detent bore into which the armature rod 14 can be inserted. For example, the control element 148 can then be pressed together with the armature rod 14 in a suitable manner and thus held on the latter in a positionally accurate manner. The control element 148 is composed substantially of two different geometric bodies, a cylinder section 150 and a cone section 152, wherein the cone section 152, on its lateral surface, forms a cone surface 154. A lateral surface 156 of the cylinder section 150 of the control element 148 is guided and possibly also mounted on an interior space wall 158 which delimits the interior space 146 in the radial direction R. At that axial end of the control element 148 which faces toward the electromagnet 8, there is situated an annular front face 160 against which the one end of the magnet spring 140 lies and is thus reliably guided and held. The cone surface 154 is situated at that end of the control element 148 which is situated opposite the front face 160.

It is conceivable that other constructions are also possible for the configuration of the control element 148. For example, it is also conceivable that the cone surface is arranged on the control element on the side facing toward the electromagnet 8, and the functioning of the locking unit 2 is then possibly altered. The illustrated locking unit 2 is configured such that, when the electromagnet 8 is electrically deenergized, that is to say when the winding 126 is electrically deenergized, the control element 148 forces the detent elements 10, which in the present case are in the form of balls, radially outward and thus blocks the piston 6 in the longitudinal direction L. Blocking of the movement of the piston 6 may however also take place when the electromagnet 8 is electrically energized. Here, according to the proposal, the situation of the gap 138 is also variable. In the exemplary embodiment shown in FIG. 4, the gap 138 is situated on that side of the armature 12 which is averted from the detent unit 120, that is to say between armature 12 and the magnet core 132. As an alternative to this, it is also possible that the gap is then formed between the armature and the yoke part, that is to say that side of the armature which faces toward the detent unit.

The arrangement of the magnet spring 140 in the interior space 146 is advantageous because, in this way, these elements do not impair the magnetic circuit that is formed in the elements around the armature space 130. Alternatively, an arrangement of the magnet spring in the armature space or else outside the detent unit is also possible in order to form a corresponding force accumulator. In the event of an electrical energization of the winding 126, the gap 138 closes by virtue of the armature 12 being displaced to the left, whereby the armature rod 14 and the control element 148 borne by the armature rod 14 are also displaced to the left, whereby the magnet spring 140 is compressed and thus forms a force accumulator for a resetting movement of the unit composed of armature 12, armature rod 14 and control element 148 upon ending of the electrical energization of the winding 126.

The hollow cylinder section 64 of the metal part 46 bears, at its end or end region 162 averted from the cap section 62 or yoke part 142, the one or more detent elements 10, which in the present case are in the form of balls. The detent elements 10 are provided as balls 10 in a ball cage. The sleeve-like or cylinder-like end region 162 of the hollow cylinder section 64 has detent element bores 164 which in this case are oriented radially (in relation to the longitudinal axis L) and which serve for receiving the detent elements 10 or balls. Depending on the axial setting of the control element 148, it is possible that the detent elements 10 or balls can or cannot deflect radially inward.

In the locking unit 2 that is shown, the piston 6 comprises two parts. The piston 6 comprises a piston tube 166, which partially projects out of the opening 108, and the piston thrust piece 168, which is produced separately from said piston tube. Here, the arrangement is selected such that the piston thrust piece 168, in the housing 40, adjoins the inner end of the piston tube 166 and/or can lie against said end. The piston tube 166 is completely hollow on the inside. The piston tube 166 lies with its flange ring 118, which is provided on the end side, against the piston thrust piece 168. The flange ring 118 therefore forms a radially oriented (in relation to the longitudinal axis L) boundary surface of the piston tube 166.

The piston thrust piece 168 has an annular recess 170 on its side facing the flange ring 118. The annular recess 170 corresponds to the flange ring 118, wherein the latter can enter the annular recess 170 and can lie in a floating manner against the piston thrust piece 168. They are therefore pressed against each other only on the basis of the action of force of the applied hydraulic pressure, on the one hand, and/or the force of the piston spring 114, on the other hand.

The piston tube 166 has, adjoining one another in the longitudinal direction L, a tube middle piece 94, a tube middle piece 70, and a punched and rolled section 68. The tube middle pieces 70, 94 are a deep drawn part. The punched and rolled section 68 is a punched and rolled part. It can be seen that the punched and rolled part or the punched and rolled section 68 is arranged outside the housing 40 in each of the two positions S1, S2 of the piston 6.

The tube middle piece 94 forms the flange ring 118 or bears the latter. The first tube middle piece 94 adjoins the second tube middle piece 70 at a narrowing 172 in the form of a shoulder. The diameter of the piston tube 166 is smaller in the region of the second tube middle piece 70 than in the region of the first tube middle piece 94. Said narrowing 172 forms a stop.

The piston 6 or the piston tube 166 thereof is guided in the opening 108. If the piston 6 is displaced to the right, the movement is limited by virtue of the fact that the shoulder-like narrowing 172 lies against the shoulder 116.

In the retracted position S1 shown here, the piston 6 has been pushed into the housing 40, and only the punched and rolled section 68, which forms an end-side connecting region 174 of the piston 6, projects out of the housing 40. Further elements (not shown here) that are moved or held by the piston 6 are connected to the piston 6 for the mechanical adjustment thereof in the connecting region 174. For this purpose, the piston 6 can have, for example, a fastening bolt 176 which runs in the radial direction R, and on which said elements (not shown) of the follow-up mechanism can be mounted.

As already stated, all axial sections of the piston tube 166, that is to say the first tube middle piece 94, the narrowing 172, the second tube middle piece 70, the punched and rolled section 68, and the connecting region 174, are hollow on the inside. It is to be noted that the connecting region 174 has a recess 178 provided in the longitudinal central plane, that is to say is slotted. In order to receive the fastening bolt 176 or similar, two diametrically opposite bores or other through openings 180 are provided in the punched and rolled section 68.

Figure 6:
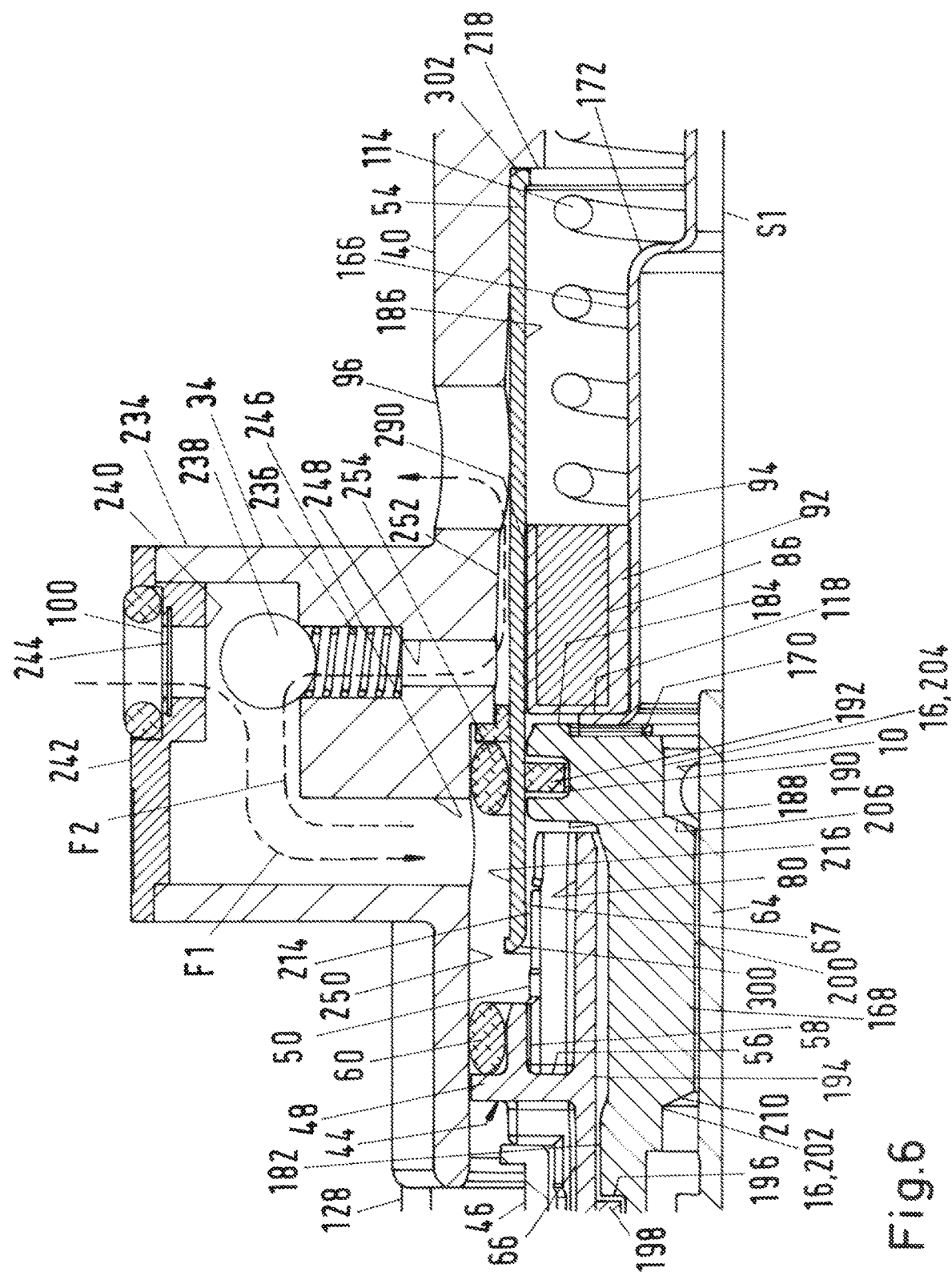
FIG. 6 shows a detail VI according to FIG. 3.

The piston thrust piece 168 is substantially sleeve-like, i.e. hollow radially on the inside, with this and the following details being illustrated in FIG. 6. Its outer surface 182 or an O-ring seal 198 serves for guiding it. At the front end facing toward the piston tube 166, an outer ring 184 is provided on the piston thrust piece 168. The outer surface of said outer ring 184 or an O-ring seal 192 is mounted, or at least guided, on a tube piece inner wall 186. The outer ring 184 can lie in an axial direction (in relation to the longitudinal axis L) against the flange ring 118 of the piston tube 166. A pressure side 188, averted from the flange ring 118, of the piston thrust piece 168 or of the outer ring 184 thereof can be acted on with pressure, for example with hydraulic pressure, and is therefore also of correspondingly solid form.

Here, an annular pressure chamber 80 is provided. The piston thrust piece 168 can be embodied as a turned part. In some aspects, the piston thrust piece 168 can be formed of tool steel. Radially on the outside, the outer ring 184 has an encircling circumferential groove 190 which receives the O-ring seal 192. Since said O-ring seal 192 is subjected to the hydraulic pressure, it is also pressed in a radial direction and thus reliably closes any remaining gap between the radial outer surface of the outer ring 184 and the tube piece inner wall 186.

Furthermore, a middle piece 44 is provided which is also illustrated, sometimes in more detail, in FIGS. 6 to 9. The middle piece 44 is likewise of sleeve-like form and, at its inner side or at the inner side of the plastics part 48, forms a bearing surface 194 for the piston thrust piece 168. Here, the bearing surface 194 interacts with the lateral surface or outer surface 182 of the piston thrust piece 168 or of the O-ring seal 198 thereof. The middle piece 44 is arranged positionally fixed in the locking unit 2. The plastics part 48 and the metal part 46 are pressed together.

The outer surface 182 here can be the lateral surface of a cylinder or cylinder section. At its end averted from the piston tube 166 and facing toward the electromagnet 8, the outer surface 182 bears the O-ring seal 198 in a circumferential groove 196. Said O-ring seal 198 seals off the gap which remains between the outer surface 182 and the bearing surface 194, and which is under pressure, in the direction of the electromagnet 8. The pressure chamber 80 is therefore sealed in the longitudinal direction L between the O-ring seals 192 and 198.

The piston 6 consists of the two components, the piston tube 166 and the piston thrust piece 168, which are formed in the variants shown here in floating fashion with respect to each other, i.e. are pressed against each other only because of the action of force of the applied pressure, on the one hand, and the counter-directed force of the piston spring 114, on the other hand. Said piston 6 composed of two components is firstly mounted on the bearing surface 194 of the middle piece 44 by way of the piston thrust piece 168. A further mounting is provided at the outer ring 184 of the piston thrust piece 168 in interaction with the tube piece inner wall 186. In addition, the piston tube 166 is mounted on the tube piece inner wall 186 by a plastics carrier 92 and at the opening 108 by the tube middle piece 70.

An inner surface 200 of the piston thrust piece 168 comprises hollows or detent receptacles 202, 204 at each end side, that is to say spaced apart from one another axially (in relation to the longitudinal axis L). The diameter of the annular hollows or annular detent receptacles 202, 204 can in this case be larger than the diameter of the inner surface 200 situated between them. The detent receptacles 202, 204 are arranged on the inner surface 200 of the piston thrust piece 168 as a shoulder or internally situated shoulder. The detent unit 120 is arranged in a positionally fixed manner in the housing 40, wherein the piston 6 is configured to be movable longitudinally relative to the detent unit 120. In the retracted position S1 shown in FIGS. 4 and 6, however, the movement of the piston 6 to the right, in the direction of the opening 108, is blocked by the detent unit 120; the locking unit 2 is blocked in the retracted position of the piston 6.

The detent unit 120 comprises detent elements 10, in this case for example balls 10 of a ball cage, which are each mounted in detent element bores 164 so as to be radially movable (with respect to the longitudinal axis L). The electromagnet 8 is shown in a deenergized position, that is to say no electrical current is applied to the winding 126. Therefore, the gap 138 forms between the armature 12 and the magnet core 132, because the magnet spring 140 displaces the armature 12, and thus also the control element 148 on which the magnet spring 140 is supported, to the right. The control element 148 thus moves to the axial position of the detent elements/balls 10, such that the cone surface 154 of the control element 148 acts on the detent elements/balls 10 and pushes these radially outward (in relation to the longitudinal axis L) into the detent receptacle 204. Then, however, a longitudinal movement of the piston 6, that is to say a movement of the piston 6 to the right, is blocked, because a first inner shoulder 206 which delimits the detent receptacle 204 lies against the radially outwardly displaced detent elements 10. The detent elements 10 cannot yield in the longitudinal direction L or circumferential direction U because of the corresponding detent element bores 164 and also cannot dip away in the radial direction R because of the position of the control element 148. The first inner shoulder 206 is in this case situated at the detent receptacle 204 at the side facing toward the detent receptacle 202.

In the retracted position S1, it is furthermore the case that that end of the piston thrust piece 168 which is averted from the piston tube 166 lies against a radially running stop surface 208 of the middle piece 44, and thus also blocks a movement of the piston 6 to the left, in the direction of the electromagnet 8.

For the sake of completeness, reference should also be made at this juncture to FIG. 5 in which the position is shown at which the piston 6 has been extended to the right at a maximum distance from the housing 40, i.e. into the extended position S2. This extended position S2 is on the one hand delimited by the abutment of the narrowing 172 against the shoulder 116 in the region of the opening 108 of the housing 40. In this position, it is in turn the case that the electromagnet 8 is deactivated, that is to say no electrical current is applied to the winding 126, whereby the control element 148 pushes the detent elements/balls 10 into the detent receptacle 202 of the piston thrust piece 168 and thus on the other hand blocks a movement to the left. The radially outwardly pushed detent elements/balls 10 then lie against a second inner shoulder 210, which delimits the detent receptacle 202. The detent receptacle 204 can be a first detent receptacle; the detent receptacle 202 can be a second detent receptacle. The second inner shoulder 210 is in this case situated at that side of the detent receptacle 202 which faces toward the detent receptacle 204. As already described, the two detent receptacles 202 and 204 are spaced apart from one another axially (in relation to the longitudinal axis L).

The piston 6, in particular the piston thrust piece 168, is mounted movably between the hollow cylinder section 64, arranged radially at the inside, and the plastics part 48 of the middle piece 44, arranged radially at the outside. The middle piece 44 assumes a central position in the locking unit 2 in the embodiment shown. On the one hand, it bears the housing 40 on its radial outer side 62 and/or by a sealing ring 60. On the other hand, it however also produces a connection to the electromagnet 8, in particular to the magnet housing 128 thereof.

Furthermore, the middle piece 44 provides for radial alignment of the electromagnet 8 with respect to the detent unit 120. It is expedient to realize a high degree of concentricity in this region.

The middle piece 44 has a connecting region 214 on its side which is averted from the electromagnet 8 or which faces the piston tube 166. Said connecting region 214 is a constituent part of the middle piece 44. Here, the connecting region 214 performs multiple tasks. Firstly, it supports a tube piece 54, which can also be referred to as sleeve piece, which is a part of the housing 40 and which, on its inner side, provides a housing inner wall or a tube piece inner wall 186. Furthermore, at least a part of the connecting region 214 delimits the pressure chamber 80, that is to say is in contact with the pressurizable fluid. For this purpose, the tube piece 54 is pushed or pressed onto the connecting region 214. As already described, the piston 6, in particular the piston thrust piece 168 thereof, lies against the tube piece inner wall 186, and in this respect the tube piece 54 has the characteristics of a cylinder. The tube piece 54 delimits or conducts the fluid or the pressure of the fluid for the adjustment of the piston 6 not only at its tube piece inner wall 186 but also at its tube outer side 216. The tube piece 54 has a rounded inner circumferential edge 300 axially at one end on the inner circumferential side and a rounded outer circumferential edge 302 axially at the other end.

The mounting of the one end of the tube piece 54 on the middle piece 44 emphasizes the central importance of the middle piece 44 in the embodiment shown here. The other end of the tube piece 54 is mounted in the housing 40, and the inner side of the tube piece 54 serves as a mounting or guide of the piston 6. In the present embodiment, the tube piece 54 is, at the right-hand side, connected in fluid-tight fashion to the housing 40 in the region of a projection 218, which can also be referred to as a step.

The locking unit has a piston sensor system and a control element sensor system. The piston sensor system comprises a magnetic element 86 or piston target and two magnetic field sensors 88, 90 or piston sensors. The magnetic element 86 is insert molded by a plastics carrier 92 which is designed as a plastics ring and, on the outer circumferential side, has a supporting surface 290 which can slide along the tube piece inner wall 186 in order to support the piston 6. The plastics carrier 92 is pressed onto the piston 6 and arranged against the flange ring 118 in an axial end region of the piston tube 166. The two magnetic field sensors 88, 90 are each arranged in a fluid opening 96 and can be washed around by fluid. The control element sensor system comprises a magnetic element 292 or control element target and a magnetic field sensor 98 or control element sensor at the housing end 106. The magnetic element 292 is arranged at one end on a connecting rod 298. At the other end, the connecting rod 298 is connected fixedly and therefore longitudinally displaceably, to the control element 148.

FIG. 5 shows a perspective sectional view through the locking unit 2 of FIG. 4 in the extended position S2. It can be seen that the piston 6 has been moved out of the housing 40. This extended position S2 is again secured by the detent unit 120, as described. The detent elements 10 have been blanked out in FIG. 5.

FIG. 6 shows a detail VI according to FIG. 3, wherein the nonreturn valve 34 which is configured as a 3/2-way ball nonreturn valve can be seen here. The nonreturn valve 34 replaces the magnetic valve 36 from FIG. 2. It permits a fluid flow into the locking unit 2, this being indicated by fluid path F1. However, it prevents a fluid flow out of the locking unit 2 at this point, as visualized by fluid path F2. This prevents air from being admitted into the hydraulic system and frothing. The open position of the nonreturn valve 34 is shown in FIG. 6. The nonreturn valve 34 comprises a valve housing 234 which is formed integrally with the housing 40 of the locking unit 2. It also comprises a valve closing spring 236 and a ball or closing ball 238 as the closing element. The valve closing spring 236 pretensions the closing ball 238 into a closing position against a sealing seat 240. The closing ball 238 can be guided on its adjustment path between its positions. The sealing seat 240 is formed by a valve cover 242 which forms the valve inlet 100 and has a filter element 244. The valve cover 242 is fixedly connected to the valve housing 234. The valve housing 234 has a first channel 246 which leads from the valve inlet 100 to a pressure-conducting channel 250 in the housing 40. The pressure-conducting channel 250 is formed between the inner wall of the housing 40 and the tube outer side 216. From there, the tube piece 54 is washed around along F1, and the fluid passes into the pressure chamber 80. If the fluid is pushed out of the pressure chamber 80, it follows fluid path F2, with the nonreturn valve 34 then being closed (not illustrated). The fluid path 2 then runs through the first channel 246 into a second channel 248 in which the valve closing spring 236 is also arranged. Via an outlet channel 252 between the inner wall of the housing 40 and the tube outer side 216, the fluid passes out of the housing 40 through a fluid opening 96. A sealing ring 254 separates the pressure-conducting channel 250 and outlet channel 252 fluidically from one another.

Figure 7:
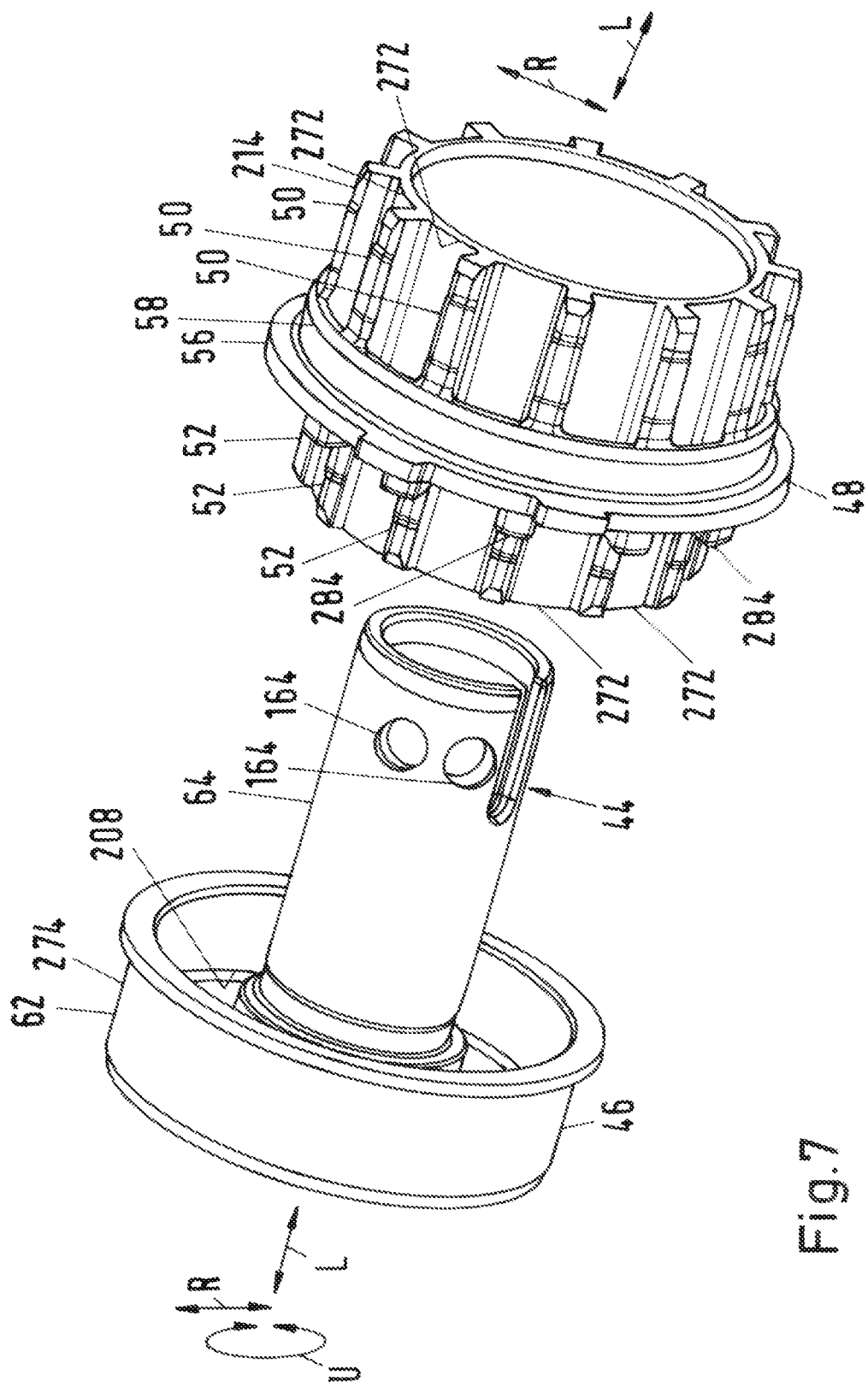
FIG. 7 shows an exploded view of a middle piece.

FIG. 7 shows an exploded view of a middle piece 44.

The two-part design of the middle piece 44 can be clearly seen. The plastics part 48 forms support segments 50, 52 which run in the longitudinal direction L on the outer circumferential side, are equidistant in the circumferential direction U and extend in the radial direction R and bear the tube piece 54 and the metal part 46, as FIGS. 8 and 9 also show. The region between the plastics part 48 and the metal part 46 is a connecting region 286, and the region between the plastics part 48 and the tube piece 54 is likewise a connecting region 288. The connecting regions 286, 288 are each designed as a crown ring. Segment intermediate spaces 272 which run in the longitudinal direction L and are formed between adjacent support segments 50, 52 are formed in each connecting region 286, 288.

Figure 9:
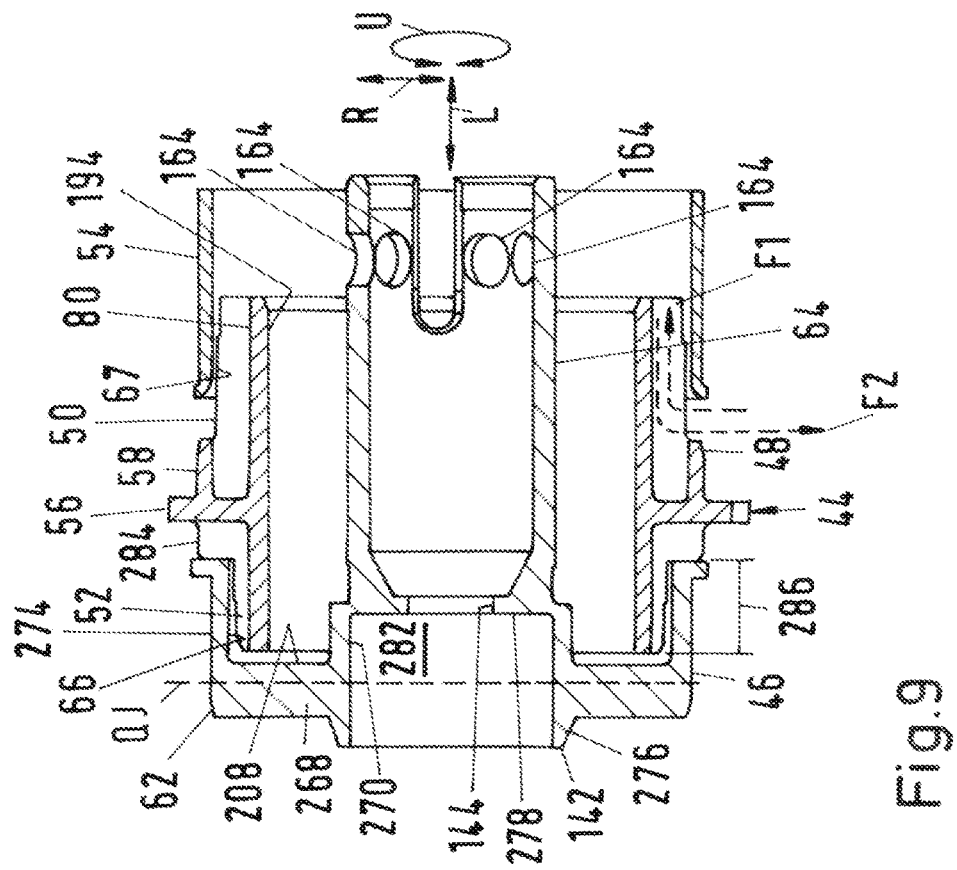
FIG. 9 shows a second sectional view of a middle piece.
Figure 8:
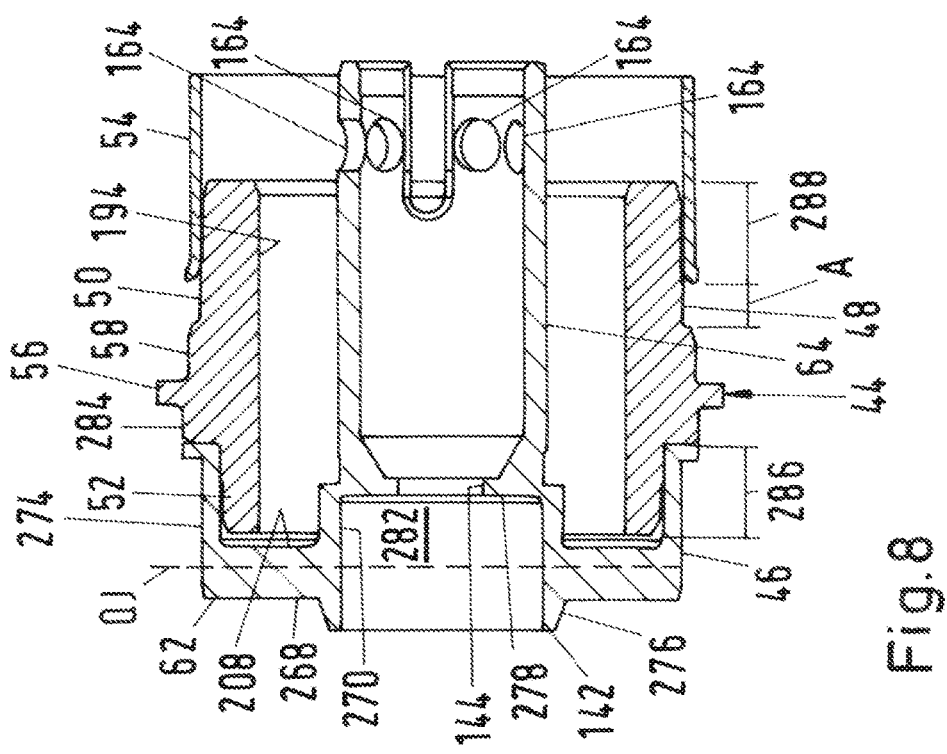
FIG. 8 shows a first sectional view of a middle piece.

FIG. 8 shows a first sectional view of a middle piece 44 through a support segment 50, 52, FIG. 9 likewise showing a sectional view of the middle piece 44, but this time through a segment intermediate space 272.

The metal part 46 has a cap section 62 and a hollow cylinder section 64 extending in the longitudinal direction L. The cap section 62 covers the plastics part 48 on the front face. In addition, the metal part 48 lies against the electromagnet 8 or the coil body 124 thereof. The cap section 62 forms the yoke part 142 which itself is part of the magnetic circuit. The armature space 130 of the electromagnet 8 is simply delimited by the cap section 62 or the yoke part 142, which can be of pot-like configuration. An arrangement can be selected here such that part of the armature 12 can enter the yoke part 142.

The cap section 62 forms a stop surface 208 for the piston thrust piece 168 of the piston 6. The cap section 62 has a front section from which a pot wall section 270 protrudes at a right angle radially on the inner circumferential side and a circumferential wall section 274 protrudes at a right angle radially on the outer circumferential side. On the circumferential side, the pot wall section 270 delimits a pot base section 278 which is connected thereto delimit. The pot wall section 270 and pot base section 278 form a pot-like receiving space 282 for the armature 12. The metal part 46 has a magnetic cone ring 276 protruding in the longitudinal direction L so as to face the electromagnet 8. The front section of the cap section 62 has a material thickness in the longitudinal direction L that is at least twice as large as the material thickness of the adjoining pot wall section 270 in the radial direction R. In addition, a transverse central plane QJ of the yoke part 142 or of the pot-like receiving space 282 extends through the front section.

The hollow cylinder section 64 extends from the pot base section 278. The hollow cylinder section has the detent element bores 164 for receiving the detent elements 10. The hollow cylinder section 64 can therefore form a ball cage. The metal part 46 has, in the pot base section 278, a through bore 144 through which the armature 12 or the armature rod 14 projects and is mounted. It can also be seen that the metal part 46 guides the armature 12 in each of its positions.

The plastics part 48 has on the outer circumferential side, a supporting flange 56 projecting in the radial direction R. Starting from the supporting flange 56, the support segments 50 extend to one side in the longitudinal direction L and the support segments 52 extend to the other side in the longitudinal direction L. The supporting flange protrudes over the support segments 50, 52 in the radial direction R and centers the middle piece 44 in relation to the housing 40. In addition, the plastics part 48 has on the outer circumferential side, a carrier flange 58 which projects in the longitudinal direction L and bears a sealing ring 60. The carrier flange 58 is formed integrally with the supporting flange 56 and is supported in the radial direction R on the support segments 50; they fit behind the carrier flange 58.

It can be seen with reference to FIG. 9 that the metal part 46 together with the plastics part 48 forms first channels 66 lying in between them. The first channels 66 lead to a compensating space 280, denoted in FIG. 4. The compensating space 280 can be produced by longitudinal displacement of the piston 6. The first channel 66 is used for pressure compensation. The plastics part 48 together with the tube piece 54 forms second channels 67 lying in between them. The second channels 67 lead to the pressure chamber 80. The segment intermediate spaces 272 are therefore designed as a fluidic connection. The first and second channels 66, 67 are channels 66, 67 that are formed by the plastics part 48 and are separated from one another. A respective channel 66, 67 is therefore formed between support segments 50, 52, which are adjacent in the circumferential direction U, the plastics part 48 radially on the inside and the metal part 46 or the tube piece 54 on the opposite radial side, i.e. radially on the outside, It can also be seen that the supporting flange 56 separates these two channels 66, 67 fluid-tightly and pressure-tightly, with the supporting flange 56 expediently being configured without apertures in the longitudinal direction L. The support segments 52 each form a longitudinal stop 284 for the metal part 46, with the respective longitudinal stops 284 extending in the radial direction R and protruding over the respective support segment 52 in the radial direction R. A longitudinal distance A, as shown in FIG. 8, is provided between the tube piece 54, on the one hand, and the carrier flange 58, on the other hand.

Figure 10:
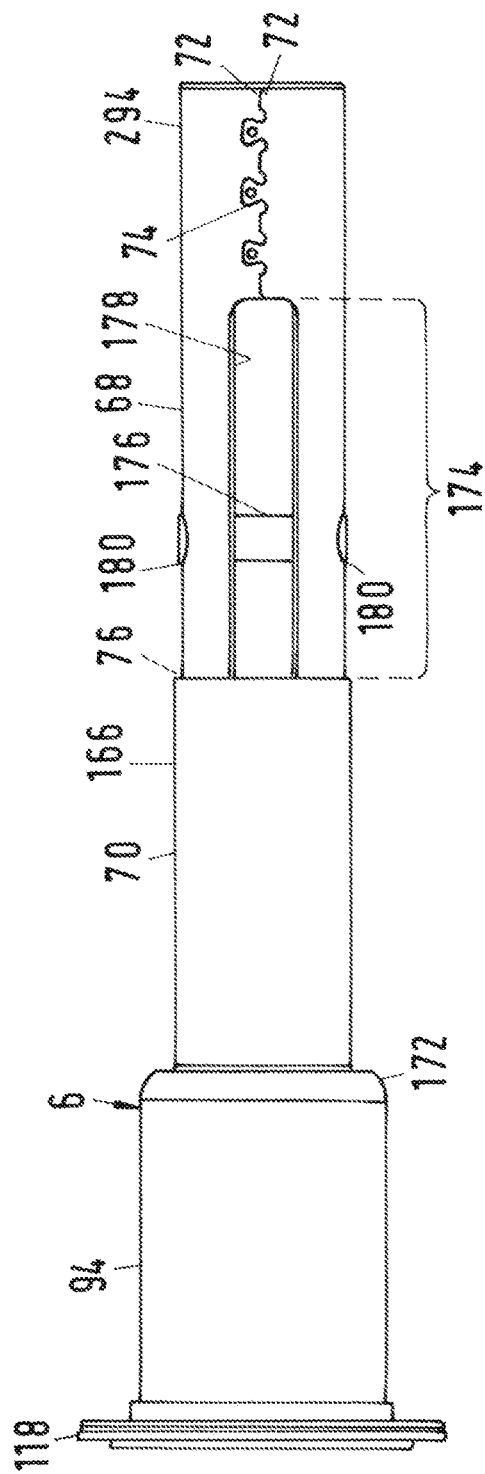
FIG. 10 shows a side view of a piston.

FIG. 10 shows a side view of a piston 6, with the diametrically opposite recesses 178 being seen here. The recesses 178 are designed as elongated holes. Diametrically opposite through openings 180 in which the fastening bolt 176 is held can also be seen. The recesses 178 and the fastening bolt 176 are expediently aligned with one another in the radial direction R. The punched and rolled section 68 is hard brazed or welded to the piston 6 or to a tube middle piece 70 of the piston 6, with a weld seam 76 being shown by way of example. The two interconnected edges 72 of the punched and rolled section 68 form a form fit with each other; the latter being configured here as a puzzle closure 74. The puzzle-shaped edges 72 have form-fitting geometries for this purpose.

Figure 11:
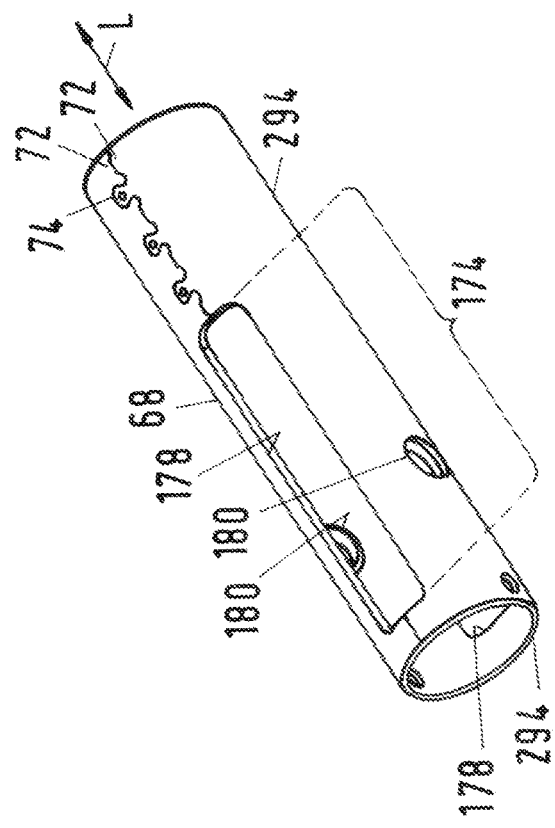
FIG. 11 shows a perspective view of a punched and rolled section of a piston.

FIG. 11 shows a perspective view of a punched and rolled section of a piston 6 from FIG. 10, with it being seen that the recesses 178 are enclosed on both sides in the longitudinal direction L by an annular section 294 of the punched and rolled part or punched and rolled section 68. As a result, a more stable design can be achieved than with an open fork head which has a recess which is open on one side. The punched and rolled part or punched and rolled section 68 is designed as a hollow cylinder with a constant diameter over its longitudinal extent.

Figure 12:
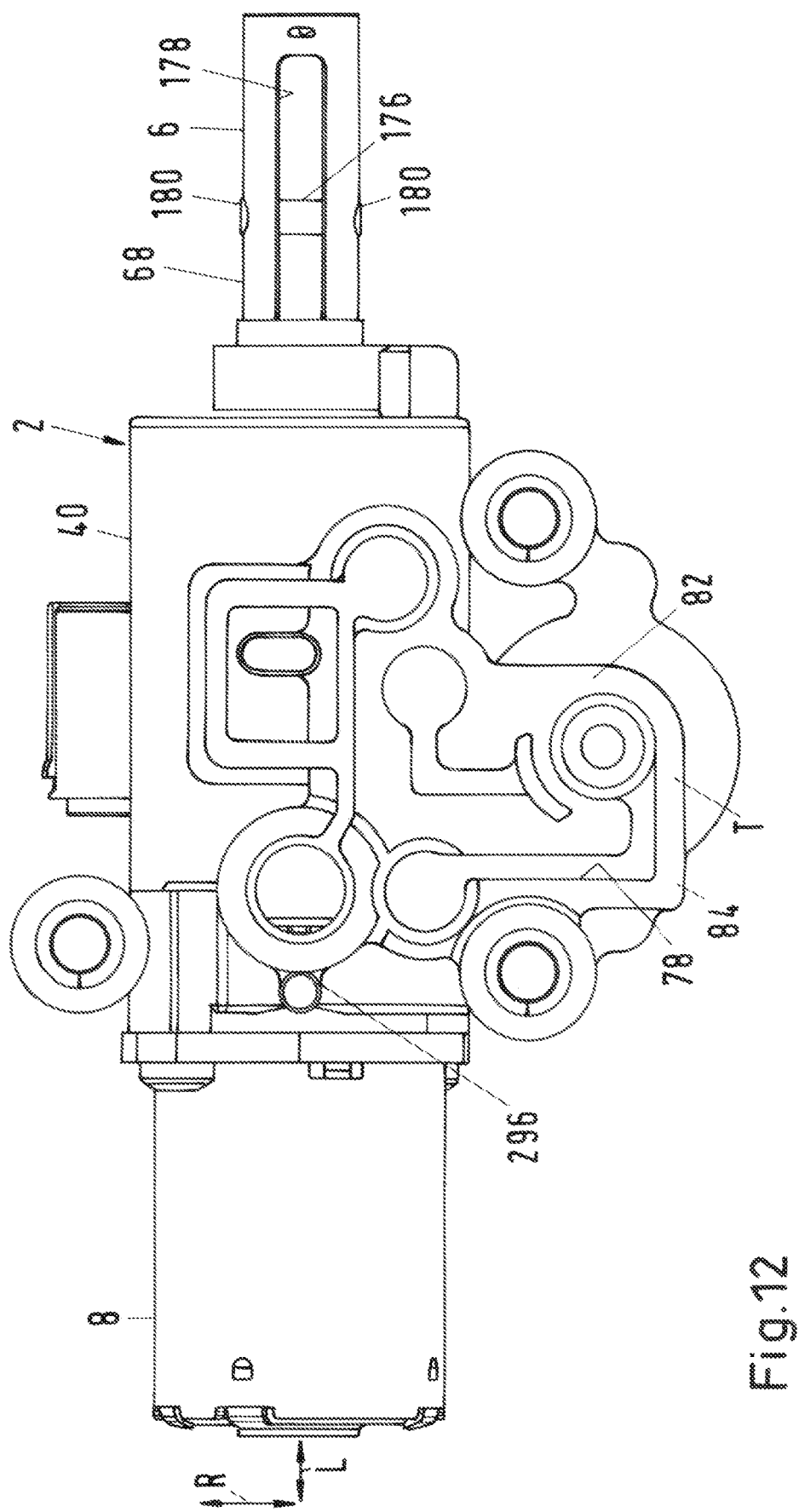
FIG. 12 shows a perspective view of a locking unit.

FIG. 12 shows a perspective view of a locking unit 2, the housing 40 forming a meandering fluid channel 78. The meandering fluid channel 78 is fluidically connected to the pressure chamber 80 and basically serves for conducting fluid into the locking unit 2. The meandering fluid channel 78 runs along a housing side 82, the housing 40 having a separating plane T in which a meandering seal 84 is arranged. A cover which covers the meandering fluid channel 78 and the meandering seal 84 can be screwed down at bores 296. However, the cover has been blanked out in order to visualize the fluid channel 78. However, it has a fluid opening which leads into the meandering fluid channel 78.

A method for operating the locking arrangement 1 or the locking unit 2 can provide at least the following steps:

determining that the piston 6 of the locking unit 2 is intended to be adjusted from the retracted position S1 or the extended position S2 into the respective other of the two positions S1, S2 (target position), determining in which operating direction the pump 28 of the coolant circuit 30 is operated, wherein
  when a suction mode of the pump 28 is determined, the operating direction of the pump 28 is adjusted into the pressure mode, or
  when a pressure mode of the pump 28 is determined, the operating direction of the pump 28 is retained in the pressure mode,
pressurizing the piston 6 with a hydraulic fluid conveyed by the pump,
determining that the piston 6 has reached the target position,
when the suction mode is determined in b): adjusting the pump 28 again into the suction mode.

The invention is not restricted to any one of the above-described embodiments, but may be modified in a variety of ways. All of the features and advantages that emerge from the claims, from the description and from the drawing, including structural details, spatial arrangements and method steps, may be essential to the invention both individually and in a wide variety of combinations.

The invention encompasses all combinations of at least two features disclosed in the description, the claims and/or the figures.

To avoid repetitions, it is the intention that features disclosed in device terms are also disclosed, and capable of being claimed, in method terms. It is likewise the intention that features disclosed in method terms are disclosed, and capable of being claimed, in device terms.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A locking unit for locking a movement of a piston which can be acted on with pressure of a fluid, the locking unit comprising:
   the piston;
   an electromagnet;
   at least one detent element;
   a middle piece; and
   a housing,
   wherein the at least one detent element interacts with an armature or an armature rod of the electromagnet, wherein the piston has at least one detent receptacle, wherein the piston can be secured by a retaining interaction of the at least one detent element with the at least one detent receptacle, wherein the piston is adjustable between a retracted position and an extended position, wherein the piston is mounted at least partially in the middle piece, wherein the middle piece is surrounded at least partially by the housing, wherein the middle piece is configured in two parts from a metal part and a plastic part,
   wherein the plastic part has supporting segments which run in a longitudinal direction on a circumferential side of the plastic part, extend in a radical direction, and can support a tubular piece, the metal part, or both the tubular piece and the metal part.

2. The locking unit according to claim 1, wherein the plastic part and the metal part are connected to one another in an integrally joined manner, a non-positive manner, a positively locking manner, or combinations thereof.

3. The locking unit according to claim 1, wherein a circumferential side of the plastic part has a supporting flange which protrudes in the radial direction.

4. The locking unit according to claim 3, wherein the supporting segments extend in the longitudinal direction, the radial direction, or both the longitudinal direction and the radial direction, starting from the supporting flange.

5. The locking unit according to claim 3, wherein the circumferential side of the plastic part has a carrier flange which protrudes in the longitudinal direction and supports a sealing ring.

6. The locking unit according to claim 1, wherein the metal part has a cap portion, a hollow-cylindrical portion, or both the cap portion and the hollow-cylindrical portion.

7. The locking unit according to claim 6, wherein the metal part has both the cap portion and the hollow-cylindrical portion, wherein the hollow-cylindrical portion extends in a longitudinal direction from the cap portion.

8. The locking unit according to claim 1, wherein the metal part and the plastic part form a channel which lies between the metal part and the plastic part.

9. The locking unit according to claim 1, wherein the plastic part and a tubular piece form a pressure space which lies between the plastic part and the tubular piece.

10. The locking unit according to claim 1, wherein the plastic part and a tubular piece form a channel which lies between the plastic part and the tubular piece.

11. The locking unit according to claim 1, wherein the metal part guides the armature of the electromagnet in each of a first position and a second position of the armature.

12. The locking unit according to claim 1, wherein the metal part has a cap portion, wherein a front portion of the cap portion has a material thickness which is greater at least by a factor of 2 than a material thickness of an adjoining portion or pot wall portion.

13. A locking unit for locking a movement of a piston which can be acted on with pressure of a fluid, the locking unit comprising:
   the piston;
   an electromagnet;
   at least one detent element;
   a middle piece; and
   a housing,
   wherein the at least one detent element interacts with an armature or an armature rod of the electromagnet, wherein the piston has at least one detent receptacle, wherein the piston can be secured by a retaining interaction of the at least one detent element with the at least one detent receptacle, wherein the piston is adjustable between a retracted position and an extended position, wherein the piston is mounted at least partially in the middle piece, wherein the middle piece is surrounded at least partially by the housing, wherein the middle piece is configured in two parts from a metal part and a plastic part, wherein the metal part has a cap portion and a hollow-cylindrical portion, wherein the hollow-cylindrical portion extends in a longitudinal direction from the cap portion.

14. A locking unit for locking a movement of a piston which can be acted on with pressure of a fluid, the locking unit comprising:
   the piston;
   an electromagnet;
   at least one detent element;
   a middle piece; and
   a housing,
   wherein the at least one detent element interacts with an armature or an armature rod of the electromagnet, wherein the piston has at least one detent receptacle, wherein the piston can be secured by a retaining interaction of the at least one detent element with the at least one detent receptacle, wherein the piston is adjustable between a retracted position and an extended position, wherein the piston is mounted at least partially in the middle piece, wherein the middle piece is surrounded at least partially by the housing, wherein the middle piece is configured in two parts from a metal part and a plastic part,
   wherein:
   i) the plastic part and a tubular piece form a pressure space which lies between the plastic part and the tubular piece,
   ii) the plastic part and a tubular piece form a channel which lies between the plastic part and the tubular piece, or
   iii) the metal part has a cap portion, wherein a front portion of the cap portion has a material thickness which is greater at least by a factor of 2 than a material thickness of an adjoining portion or pot wall portion.

* * * * *